United States Patent [19]

Carayannis et al.

[11] Patent Number: 5,237,642
[45] Date of Patent: Aug. 17, 1993

[54] OPTIMAL PARAMETRIC SIGNAL PROCESSOR

[75] Inventors: George Carayannis; Christos Halkias, both of Athens, Greece; Dimitris Manolakis, Chestnut Hill, Mass.; Elias Koukoutsis, Athen, Greece

[73] Assignee: Adler Research Associates, Union, N.J.

[21] Appl. No.: 825,309

[22] Filed: Jan. 22, 1992

Related U.S. Application Data

[63] Continuation of Ser. No. 473,120, Jan. 31, 1990, abandoned, which is a continuation of Ser. No. 342,730, Apr. 24, 1989, abandoned, which is a continuation of Ser. No. 837,260, Mar. 7, 1986, abandoned.

[51] Int. Cl.$^5$ ............................................. G10L 9/00
[52] U.S. Cl. ........................................................ 395/2
[58] Field of Search ..................................... 381/29-53; 395/2; 364/133, 724.01, 724.05, 724.17, 728

[56] References Cited

U.S. PATENT DOCUMENTS

| | | | |
|---|---|---|---|
| 3,662,115 | 5/1972 | Saito | 179/15 A |
| 4,340,781 | 7/1982 | Ichikawa et al. | 381/41 |
| 4,378,469 | 3/1983 | Fette | 381/41 |
| 4,389,540 | 6/1983 | Nakamura et al. | 381/41 |
| 4,401,855 | 8/1983 | Broderson et al. | 381/41 |
| 4,544,919 | 10/1985 | Gerson | 364/724 |
| 4,641,238 | 2/1987 | Kneib | 364/200 |
| 4,740,906 | 4/1988 | Renner et al. | 364/724 |
| 4,750,190 | 6/1988 | Moreau et al. | 375/27 |

OTHER PUBLICATIONS

N. Levinson, "The Wiener RMS (Root-Mean-Square) Error Criterion in Filter Design and Prediction", J. Math Phys., vol. 25, pp. 261-278, Jan. 1947.

J. Durbin, "The Filtering of Time Series Models", Rev. Int. Statist. Inst., vol. 28, pp. 233-244, 1960.

H. Lev-Ari and T. Kailath, "Schur and Levinson Algorithms for Non-Stationary Processes", IEEE International Conference on Acoustics, Speech and Signal Processing, 1981, pp. 860-864.

Le Roux and Gueguen, "A Fixed Point Computation of Partial Correlation, Coefficients", IEEE Transactions on Acoustics, Speech, and Signal Processing, Jun. 1977, pp. 257-259.

Kung and Hu, "A Highly Concurrent algorithm and Pipelined Architecture for Solving Toeplitz Systems", IEEE Transactions on Acoustics, Speech and Signal Processing, vol. ASSP-31, No. 1, Feb. 1983, pp. 66-76.

G. Carayannis et al., "A New Look on the Parallel Implementation of the Schur Algorithm for the Solution of Toeplitz Equations", IEEE International Conference on Acoustics, Speech and Signal Processing, Mar. 26-29, 1985.

G. Caraynnis et al., "Fast Recursive Algorithms for a Class of Linear Equations", IEEE Transactions on Acoustics, Speech and Signal Processing, vol. ASSP-30, No. 2, Apr. 1982, pp. 227-239.

*Primary Examiner*—Michael R. Fleming
*Assistant Examiner*—Michelle Doerrler
*Attorney, Agent, or Firm*—Davis Hoxie Faithfull & Hapgood

[57] ABSTRACT

A signal processor, which receives autocorrelation coefficients, provides lattice coefficients in an optimal manner, and allows the use of any number of available parallel processing units. The signal processor may be implemented in a fully parallel or fully sequential manner, or in a "parallel-partitioned" implementation which provides the benefits of parallel processing, manageable hardware complexity, and optimal signal processing for a given number of available processors.

28 Claims, 7 Drawing Sheets

BASIC CELL 1 ———
BASIC CELL 2 - - - - -
BASIC CELL 3 • • • • • •

OPTIMAL PARAMETRIC SIGNAL PROCESSOR

This is a continuation of copending application(s) Ser. No. 07/473,120 filed on Jan. 31, 1990 now abandoned which was a continuation of Ser. No. 342,730 filed on Apr. 24, 1989 abandoned which was a continuation of Ser. No. 837,260, filed on Mar. 7, 1986, abandoned.

FIELD OF THE INVENTION

The present invention relates to the field of signal processing, and in particular, parametric signal processing.

BACKGROUND OF THE INVENTION

Parametric signal processing is used in many areas, such as speech and image analysis, synthesis and recognition, neurophysics, geophysics, array processing, computerized tomography, communications and astronomy, to name but a few.

One example of signal processing of particular importance is the linear prediction technique, which is used for speech analysis, synthesis and recognition, and for the processing of seismic signals, to enable the reconstruction of geophysical substrata. The linear prediction technique employs a specialized autocorrelation function.

Another form of signal processing which finds a multitude of applications, is the determination of an optimal (in the least square sense) finite impulse response filter. A signal processor employing such a technique works with the autocorrelation of the filter input signal and the cross-correlation between the input and the desired response signal, and may be used in many of the above-mentioned applications.

Still another form of signal processing of particular importance is known in the art as "L-step ahead" prediction and filtering, for solving the "optimum lag" problem. This technique is especially useful in designing spiking and shaping filters. Signal processors which perform this function employ a specialized autocorrelation function which also takes into account a time lag associated with the system.

Generally, as the order of the system under investigation increases, the complexity of the signal processing necessary to provide useful information also increases. For example, using the general Gaussian elimination procedure, a system of order p can be processed in "$O(p^3)$" steps, indicating the number of steps as being "on the order of" $p^3$, i.e., a function of p cubed. Thus, it will be appreciated that a system having order of $p = 100$ requires on the order of one million processing steps to process the signal, a limitation of readily apparent significance, especially where real time processing is required.

Signal processing techniques have been developed which have reduced the number of operations required to process a signal. One such method has been based on a technique developed by N. Levinson, which requires $O(p^2)$ sequential operations to process the signal. In particular, the "Levinson technique" requires $O(2 \cdot p^2)$ sequential operations in order to process the signal. An improved version of this technique, known as the "Levinson-Durbin" technique requires $O(1 \cdot p^2)$ sequential operations to process the signal. Neither of these schemes is suitable for parallel implementation. On the general subject of the Levinson and Levinson-Durbin techniques, see N. Levinson, "The Wiener RMS (Root-Mean-Square) Error Criterion in Filter Design and Prediction", *J. Math Phys.*, Vol. 25, pages 261–278, January 1947; and J. Durbin, "The Fitting of Time Series Models", *Rev. Int. Statist. Inst.*, Vol. 28, pages 233–244, 1960.

Although they represent an order of magnitude improvement over the Gaussian elimination technique, the Levinson and Levinson-Durbin techniques are too slow for many complex systems where real time processing is required.

Another way of implementing the main recursion of the Levinson-Durbin technique, for the computation of what is widely known as "lattice coefficients", was developed by Schur in 1917, in order to establish a system stability criterion. See I. Schur, "Uber Potenzreihen Die Im Innern Des Einheitskreises Beschrankt Sind", *J. Reine Angewandte Mathematik*, Vol. 147, 1917, pages 205–232. Lev-Ari and Kailath, of Stanford University, have developed a different approach, based on the Schur and Levinson techniques, which provides a triangular "ladder" structure for signal processing. The Lev-Ari and Kailath technique uses the signal, per se, as the input to the processor, rather than autocorrelation coefficients, and it is used in the signal modelling context. See H. Lev-Ari and T. Kailath, "Schur and Levinson Algorithms for Nonstationary Processes", *IEEE International Conference on Acoustics, Speech and Signal Processing*, 1981, pages 860–864.

In another modification to the Schur technique, Le Roux and C. Gueguen re-derived the Schur algorithm, giving emphasis to the finite word length implementation, using fixed point arithmetics. See Le Roux and Gueguen, "A Fixed Point Computation of Partial Correlation, Coefficients", *IEEE Transactions on Acoustics, Speech, and Signal Processing*, June 1977, pages 257–259.

Finally, Kung and Hu, have developed a parallel scheme, based on the Schur technique, which uses a plurality of parallel processors, to process a signal, having order p, in O(p) operations, a significant improvement compared to the Levinson-Durbin technique. See Kung and Hu, "A Highly Concurrent Algorithm and Pipelined Architecture for Solving Toeplitz Systems", *IEEE Transactions on Acoustics, Speech and Signal Processing*, Vol. ASSP-31, No. 1, February 1983, pp. 66–76. However, the application of the Kung and Hu technique is severely limited insofar as it requires that the number of processors be equal to the order of the system to be solved. Thus, the Kung and Hu technique cannot process a signal produced by a system having an order greater than the number of parallel processors. System complexity is therefore a major limiting factor in using the Kung and Hu technique, insofar as many complex systems may have orders much higher than the number of parallel processors currently available in modern VLSI or other technology.

OBJECTS AND SUMMARY OF THE INVENTION

It is therefore an object of the present invention to overcome the difficulties associated with prior art signal processors and methods.

It is another object of the present invention to provide an optimal parametric signal processor and processing method.

It is another object of the present invention to provide a signal processor and processing method which can be implemented using (i) a single processing unit, to process a signal in a fully sequential manner, (ii) a plurality of processing units to process a signal in fully parallel manner, or (iii) a lesser plurality of processing units to process a signal in a "partitioned parallel" manner.

It is another object of the present invention to provide a linear prediction signal processor which also forms the basis for L-step ahead and least square-finite impulse response (LS-FIR) processors.

In accordance with a basic aspect of the present invention, a signal processor which receives autocorrelation coefficients of a system, for providing lattice coefficients of the system, includes a plurality of processing units, a feedback structure, a data supply structure, and dividing circuitry. The processing units include inputs for receiving autocorrelation coefficients, intermediate values and lattice coefficients, and outputs for producing intermediate values. At least one of the processing units produces two quantities, the ratio of which equals a lattice coefficient.

The data supply structure supplies, during a first time interval, a first subset of autocorrelation coefficients and a first lattice coefficient, to the n processing units to thereby produce first intermediate values. The feedback structure applies selected ones of the first intermediate values to at least one of the processing units, and the data supply structure supplies a second lattice coefficient to the same processing unit, to thereby produce second intermediate values, the first and second intermediate values being produced, in sequence, in the first time interval.

The data supply structure supplies the first lattice coefficient and at least some of any remaining autocorrelation coefficients not supplied to the processing units in the first time interval, to at least one of the processing units during a second time interval, subsequent to the first time interval, to produce additional first intermediate values.

The dividing circuitry divides a pair of autocorrelation coefficients to produce the first lattice coefficient and divides the two quantities from one of the processing units to produce the second lattice coefficient.

The processing units are comprised of either a single two cycle processor, or of two, single cycle processors.

BRIEF DESCRIPTION OF THE DRAWINGS

These and other objects, aspects and embodiments of the present invention will be described in more detail below with reference to the follow drawing figures, of which.

DETAILED DESCRIPTION OF THE INVENTION

The Non-Symmetrical Case

Figure 1:
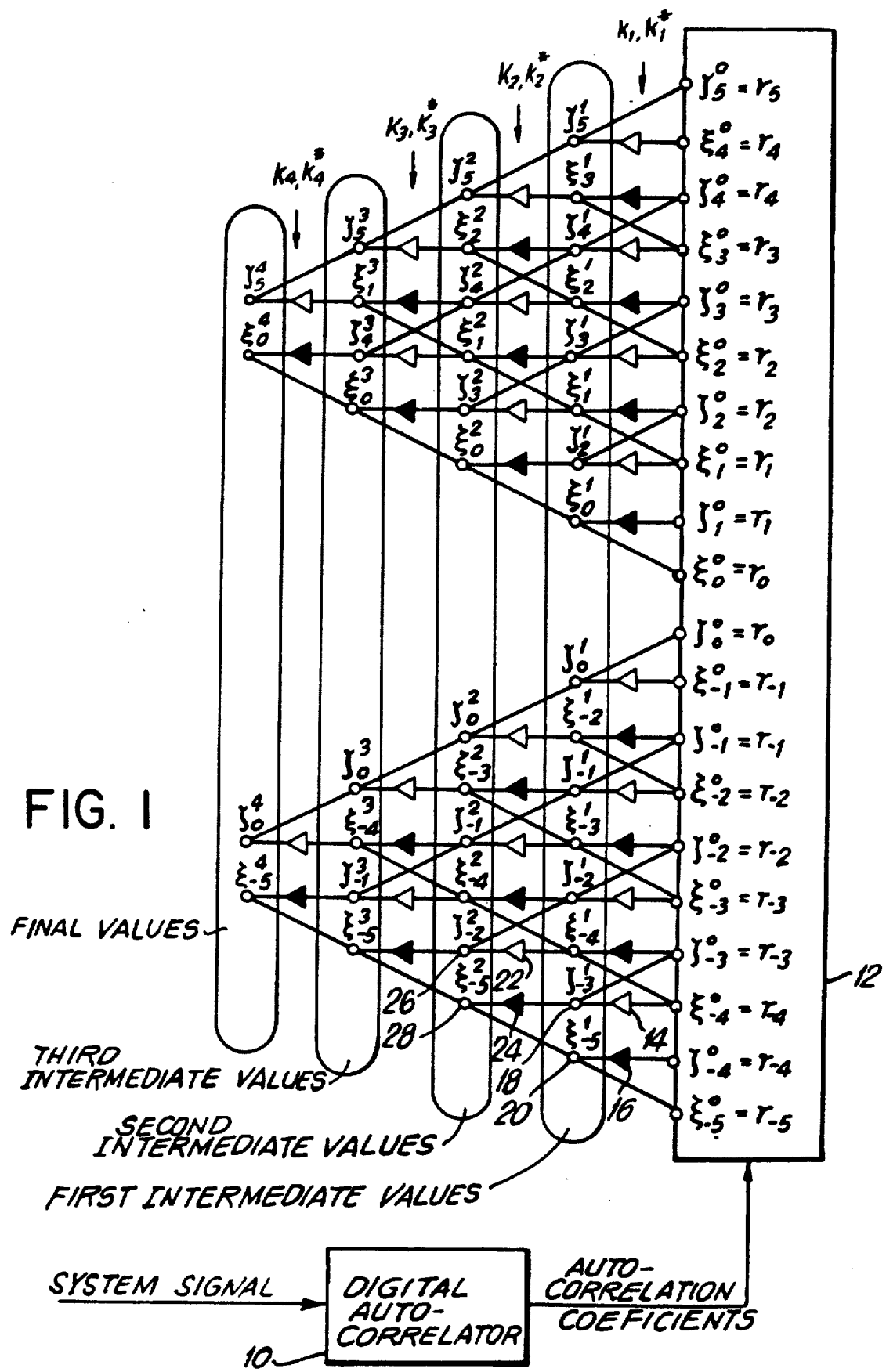
FIG. 1 illustrates the "superlattice" processing structure, for the non-symmetrical case, in accordance with the present invention.

With reference to FIG. 1, there is shown a "superlattice" structure of multipliers, designated by triangles, and adders, designated by circles, arranged in a manner to process a signal in order to produce a linear predictor for a non-symmetrical system. This superlattice structure also forms the basis for L-step ahead and LS-FIR processors.

As shown in the figure, a signal from a system, having order P, such as a seismic signal, is applied to a well known digital autocorrelator 10, which produces autocorrelation coefficients $r_{-5}$ through $r_5$. The autocorrelation coefficients are delivered to an input device 12, such as a digital register, or buffer memory, for application to the superlattice structure. With the exception of autocorrelation coefficients $r_{-5}$, $r_0$ and $r_5$, each autocorrelation coefficient is applied to a pair of multipliers which function to multiply each coefficient by a pair of "lattice coefficients" $k_n$ and $k_{n^*}$, $k_n$ being the normal lattice coefficient, and $k_{n^*}$ being the "adjoint" lattice coefficient. The multipliers indicated by white triangles function to multiply to autocorrelation coefficients by the normal lattice coefficient $k_n$, while the multipliers indicated by the black triangles function to multiply the autocorrelation coefficients by the adjoint lattice coefficients $k_{n^*}$. Production of the normal and adjoint lattice coefficients will be described below.

The two products produced by multiplying each autocorrelation coefficient by the normal and adjoint lattice coefficients are added, in the adders indicated by the circles in the figure, to an adjacent pair of autocorrelation coefficients, to produce a set of first intermediate values $\zeta_n^1$, where $n = -3, -2, -1, 0, 2, 3, 4, 5$, and $\xi_m^1$, where $m = -5, -4, -3, -2, 0, 1, 2, 3$. For example, the autocorrelation coefficient $r_{-4}$, is multiplied by $k_1$ and $k_{1^*}$, in multipliers 14 and 16, respectively, and the products are added to the pair of autocorrelation coefficients $r_{-3}$ and $r_{-5}$, which are adjacent to coefficient $r_{-4}$, in adders 18 and 20, respectively. Similarly, autocorrelation coefficient $r_{-3}$, after multiplication by lattice coefficients $k_1$ and $k_{1^*}$, is individually added to the adjacent pair autocorrelation coefficients $r_{-4}$ and $r_{31\,2}$. The same process takes place for autocorrelation coefficients $r_{-2}$ through $r_4$, to produce the set of first intermediate values, as shown.

For the sake of continuity, the autocorrelation coefficients $r_{-5}$ through $r_5$, are also designated as $\zeta_n^0$ and $\xi_m^0$, where $n = -4$ to 5 and $m = -5$ to 4.

The lattice coefficients are calculated as follows:

$$k_{m+1} = -\zeta_{m+1}^m / \zeta_0^m$$

$$k^*_{m+1} = -\xi_{m+1}^m / \xi_0^m$$

The lattice coefficients $k_1$ and $k_{1^*}$ are produced directly from the autocorrelation coefficients, while the second set of lattice coefficients, $k_2$ and $k_{2^*}$, are calculated from the first intermediate values.

In a manner similar to that performed to generate the first intermediate values, selected pairs of adjacent first intermediate values, for example, $\xi_{-4}^1$ and $\zeta_{-3}^1$ are multiplied by the normal and adjoint lattice coefficients $k_2$ and $k_{2*}$, respectively, in multipliers 22 and 24. Two first intermediate values $\zeta_{-2}^1$ and $\xi_{-5}^1$, adjacent to, and on either side of the selected pair, are added to the products produced by multipliers 22 and 24, respectively, to produce two second intermediate values $\zeta_{-2}^2$ and $\xi_{-5}^2$. The remaining second intermediate values are generated in a similar manner, namely, by multiplying a selected pair of adjacent first intermediate values by the normal and adjoint lattice coefficients $k_2$ and $k_{2*}$, and by adding to the products, the first intermediate values adjacent to, and on either side of, the selected pair.

It will also be seen that, following this signal flow, the third intermediate values and final intermediate values are generated in a similar manner.

The lattice coefficients $k_i$ completely characterize the linear predictor and can be used instead of the direct predictor coefficients. In fact, they are preferred for storage, transmission and fast speech synthesis, since they have the considerable advantages of being ordered, bounded by unity and can readily be used for stability control, efficient quantization, and the like. Since $r_0$ corresponds to the energy of the signal, and will therefore have the greatest amplitude of any of the signals processed by the superlattice, all variables can be normalized with respect to $r_0$, thus facilitating the use of "fixed point" processing with its attendant advantages of precision, speed, and processing simplicity.

The arrangement shown in FIG. 1 can produce lattice coefficients for a system of the type $Ra = -d$, where R has a Toeplitz structure. A detailed analysis of this technique is given by G. Carayannis et al., "A New Look on the Parallel Implementation of the Schur Algorithm for the Solution of Toeplitz Equations", *IEEE International Conference on Acoustics, Speech and Signal Processing*, Mar. 26–29, 1985, the entire disclosure of which is hereby incorporated by reference.

Figure 2:
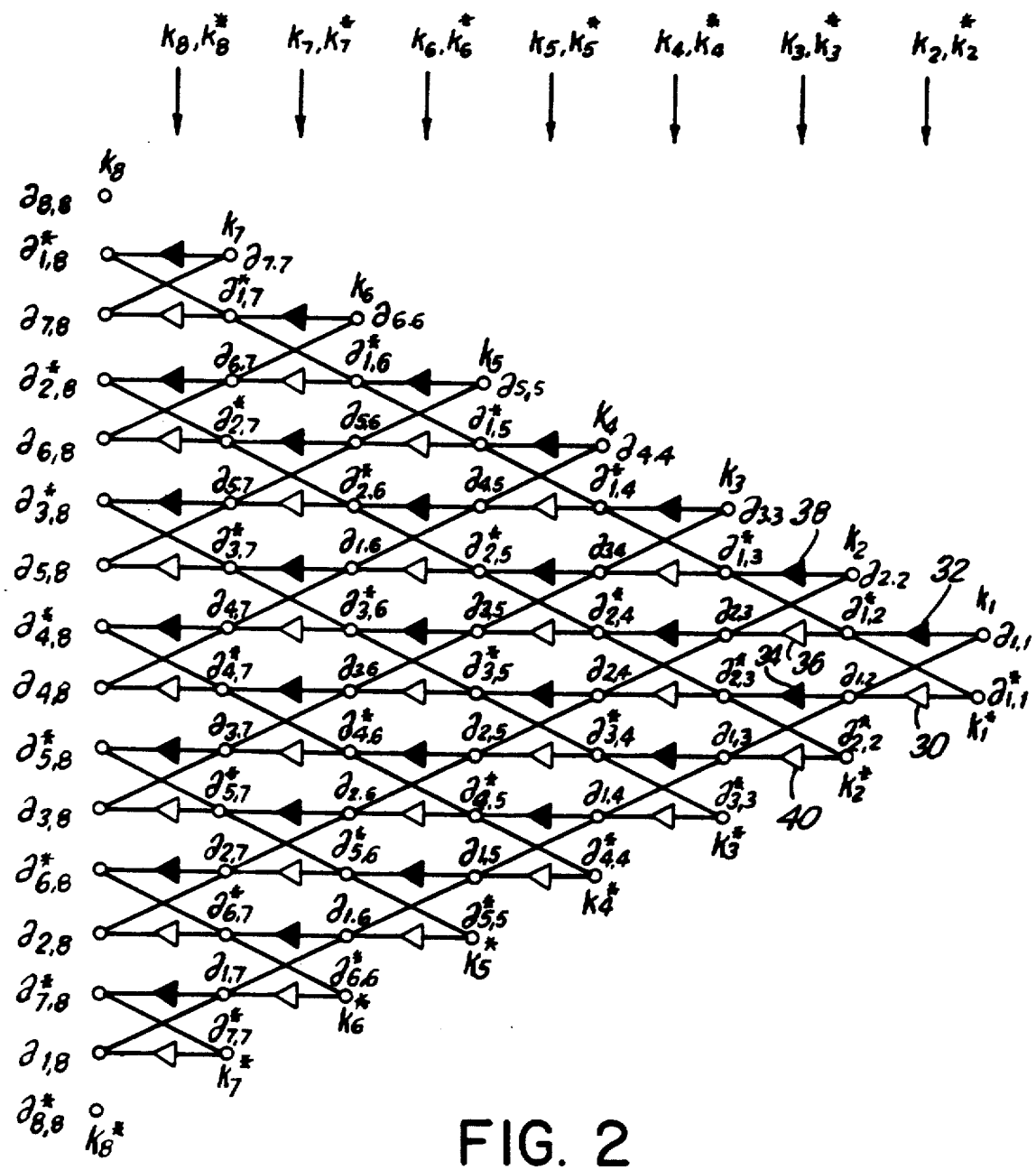
FIG. 2 illustrates the signal processing structure in accordance with the present invention, which allows the direct predictor coefficients $a_i$, to be derived from the lattice coefficients $k_i$ produced by the structure of FIG. 1.

Although the lattice coefficients $k_i$ an $k_{i*}$ are usually preferred, the direct predictor coefficients $a_i$, which are useful in spectral estimation, for example, can be derived from the lattice coefficients using the processing structure of FIG. 2. As shown, the lattice coefficients $k_1$ and $k_{1*}$ are applied to a pair of multipliers 30 and 32, which function to multiply those lattice coefficients by the second lattice coefficients $k_2$ and $k_{2*}$, respectively, to produce a first set of products $a_{1,2}$ and $a^*_{1,2}$, respectively. These products are then multiplied, in multipliers 34 and 36, respectively, by $k_{3*}$ and $k_3$, and added to $k_{2*}$ and $k_2$, respectively, to produce the values $a^*_{2,3}$ and $a_{2,3}$, respectively. Also, the value of the lattice coefficients $k_2$ and $k_{2*}$ are multiplied by $k_{3*}$ and $k_3$, respectively, in multipliers 38 and 40, and the intermediate values $a^*_{1,2}$ and $a_{1,2}$ are added to these products to produce further intermediate values $a^*_{1,3}$ and $a_{1,3}$, respectively. This process continues until the direct filter coefficients $a_{1,8}$ through $a_{8,8}$ and $a^*_{1,8}$ through $a^*_{8,8}$ are produced.

The Symmetrical Case

Figure 3:
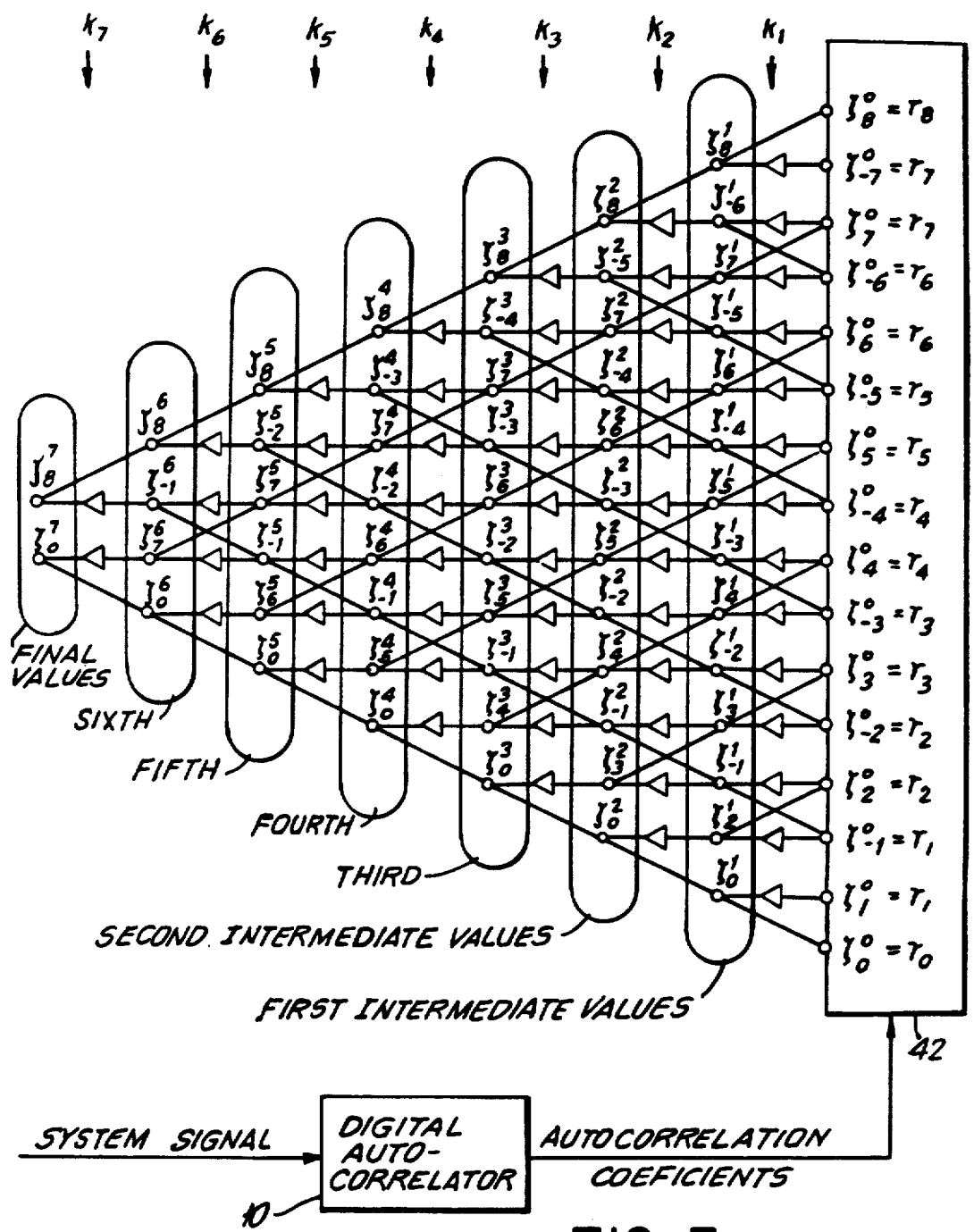
FIG. 3 illustrates the "superlattice" processing structure for the symmetrical case, in accordance with the present invention.

A special situation exists where the system to be analyzed can be characterized by $Ra = -d$, where R has a symmetrical Toeplitz structure, as in the case of auto-regressive linear prediction. In such cases, the superlattice structure of FIG. 1 is simplified to the symmetrical superlattice form shown in FIG. 3, since $r_i = r_{-i}$, $k_i = k_i^*$ and $\zeta_i^m = \xi_{-i}^m$, for the symmetrical case. Thus, the two triangular lobes of FIG. 1 become identical, so that one of them can be omitted, allowing the elimination of half of the signal processing. The signal processing structure for the symmetrical case, shown in FIG. 3, provides linear prediction, or auto-regressive modelling, by calculating the lattice coefficients, or in the symmetrical case, the "PARCOR" (partial correlation) coefficients.

It should initially be noted that with this signal processing structure (as well as that shown in FIG. 1) there is no redundancy. That is, each $\zeta$ appearing in the processor is produced only once. Additionally, only those signals needed for the production of lattice coefficients, or PARCORs are involved. Thus, the signal processing structure shown in FIG. 3 (and in FIG. 1) represent optimal processing schemes.

The signal processor illustrated in FIG. 3 can be implemented as described with reference to FIGS. 4–8, below. For the purposes of simplicity, this discussion is limited to the symmetrical case. However, the implementation of the non-symmetrical case will become apparent in view of the description of the symmetrical case.

In a manner similar to that shown for the non-symmetrical case of FIG. 1, a system signal is applied to a digital autocorrelator 10, which produces autocorrelation coefficients which characterize the symmetrical system, namely, $r_0$ through $r_8$. The coefficients are applied to an input device 42, such as a digital register or memory. Note that the signal processor of FIG. 3 receives a signal from a system having an order of 8, whereas the system in FIG. 1 receives a signal from a system having an order of 5.

As with the signal processor of FIG. 1, the signal processor of FIG. 3 takes each autocorrelation coefficient, except the first and last, namely $r_0$ and $r_8$, and multiplies it by the first lattice coefficient $k_1$, which is calculated from $r_0$ and $r_1$ ($\zeta_0^0$, $\zeta_1^0$), according to the general formula $k_p = -\zeta_p^{p-1}/\zeta_0^{p-1}$. The product of each such multiplication is added, individually, to the adjacent two autocorrelation coefficients, to produce the first intermediate values $\zeta_n^1$, where n = 0, 2 to 8 and −6 to −1. For example, autocorrelation coefficient $r_1$, designated as $\zeta_1^0$ and $\zeta_{-1}^0$, for the sake of conformance with the intermediate variables, is multiplied by lattice coefficient $k_1$, and autocorrelation coefficients $r_0$ and $r_2$ are added, individually, to the product, to produce a pair of first intermediate values $\zeta_0^1$ and $\zeta_2^1$, respectively. Similarly, the next two first intermediate values, namely $\zeta_{-1}^1$ and $\zeta_3^1$ are produced by multiplying autocorrelation coefficient $r_2$ by the lattice coefficient $k_1$, and adding, individually, the adjacent autocorrelation coefficients, namely, $r_1$ and $r_3$ to the products.

The second intermediate values can be calculated from the first intermediate values in a similar manner. First, $k_2$ can be calculated from the ratio of $\zeta_2^1$ and $\zeta_0^1$ in accordance with the formula given above. Then, second intermediate values $\zeta_3^2$ and $\zeta_0^2$, for example, are calculated by multiplying the first intermediate values $\zeta_{-1}^1$ and $\zeta_2^1$ by the lattice coefficient $k_2$, and adding the adjacent first intermediate values $\zeta_3^1$ and $\zeta_0^1$ to the products, individually. The signal processing continues until the final values $\zeta_8^7$ and $\zeta_0^7$ are obtained, from which the last lattice coefficient $k_8$ can be calculated from the above formula.

If direct predictor coefficients are desired, the processing structure shown in FIG. 2 can be employed for the symmetrical case as well as the non-symmetrical case. However, the processing structure of FIG. 2 is somewhat simplified for the symmetrical case since $k_n = k_n\cdot$.

Returning to FIG. 3, several points should now be noted. Although drawn as a triangular lobe, to illustrate the precise details of the signal processing, it will be appreciated that the various items of hardware, namely, the multipliers, designated by triangles, and the adders, designated by circles, can be comprised of a single set of 14 multipliers and 14 adders which first function to produce the first intermediate values, then the second intermediate values, and so on through the final values. Furthermore, if 14 multipliers and adders are not available, a lesser number can be shared within any given group of intermediate values.

Figure 4:
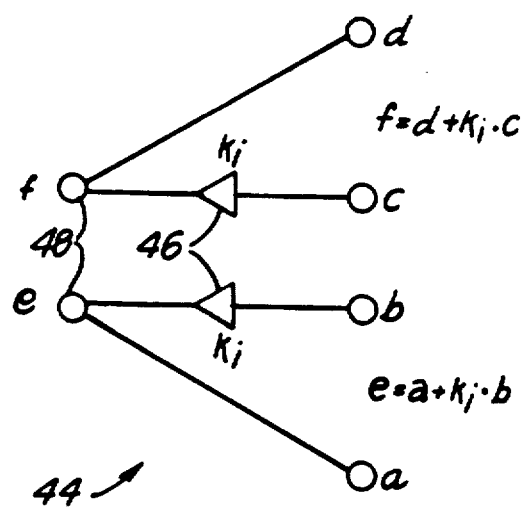
FIG. 4 illustrates a "basic cell" in accordance with the present invention.

Specifically, FIG. 4 illustrates a "basic cell" 44 which comprises a pair of multipliers 46 and a pair of adders 48. As shown in FIG. 4, the basis cell 44 functions to produce a signal $e = a + k_i \cdot b$, and a signal $f = d + k_i \cdot c$.

The basic cell can be realized with one "two-cycled" processor, or two "one-cycled" processors, to provide signals e and f. The use of the basic cell, as defined in FIG. 4, provides a homogeneous configuration in the hardware, in the sense that the repetition of the same basic cell suffices to produce the whole superlattice structure.

Figure 5:
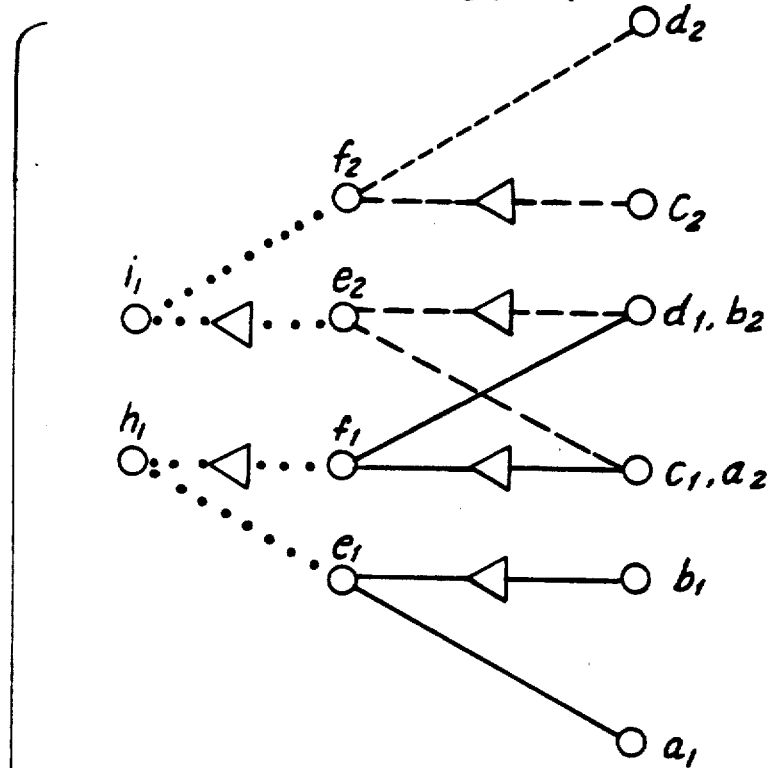
FIG. 5 illustrates the repeated use of the basic cell of FIG. 4, in order to provide the processing structure of FIGS. 1 and 3.

More specifically, FIG. 5 illustrates three basic cells denoted by solid, dashed and dotted lines, respectively. By merely duplicating the processing unit illustrated in FIG. 4, a superlattice of any size can be "constructed", to process a signal of virtually any complexity. For example, the superlattice of FIG. 5 will process a signal from a system having order 3. To process a signal from a system having order 4, a first additional basic cell can be "placed on top of" the basic cell 2, to produce first intermediate values $e_3$ and $f_3$ (not shown). A second additional basic cell would similarly be added, to receive as inputs, $e_2$, $f_2$, $e_3$ and $f_3$, to produce outputs $h_2$, $i_2$ (not shown). Finally, a third additional basic cell would be used to receive $h_1$, $i_1$, $h_2$ and $i_2$ as inputs, and produce outputs $j_1$ and $l_1$ (also not shown).

Fully Parallel Implementation

With recent advances in VLSI technology, the present invention is able to take advantage of the presence of more than one processor, in a multi-processor environment, wherein each parallel processor (or pair of processors) functions as a "basic cell".

Returning to FIG. 3, a "fully parallel" implementation is one in which all first intermediate values are produced essentially simultaneously, in parallel, and then, at a later time, all second intermediate values are produced in parallel, and so on, until the signal parameters have propagated through the entire superlattice. The fully parallel implementation of the superlattice is optimal in terms of signal processing speed.

For a fully parallel implementation, at least $p-1$ basic cells must be provided for a system having order p. From FIG. 3 it can be seen that seven basic cells are required for a system having order 8. In operation, the autocorrelation coefficients are delivered to the input device 42, such as a digital register or buffer memory, and applied to the seven basic cells substantially simultaneously, to produce the set of first intermediate values. These intermediate values are then "fed back" into the input device 42 for reapplication to the processing units. However, since there are only fourteen of the first intermediate values, compared to the sixteen input values generated from the autocorrelation coefficients, during the second step, only six of the seven basic cells are utilized, rather than all seven, to produce the set of second intermediate values. The second intermediate values are similarly "fed back" into the input device 42 and reapplied to five of the basic cells, to produce the set of third intermediate values, and so on until the set of sixth intermediate values are "fed back" to a single basic cell, to produce the final values.

It will be seen that a sequence of $p-1$ parallel steps are required to compute the PARCORs. In other words, the complexity of the signal processor is on the order of p, and $p-1$ processing units are required for the implementation of the fully parallel technique. This compares favorably to the technique proposed by Kung and Hu, cited above, which requires more processing elements. A computer program, written in Pascal, for simulating the fully parallel implementation, is given in Appendix 1, below.

Order Recursive Implementation

It will be appreciated from an inspection of FIG. 5 that the entire superlattice structure of the signal processor in accordance with FIG. 3 can be built using a single basic cell, as a "building block". For example, the basic cell shown in FIG. 4 can first function as basic cell 1, in FIG. 5, to process values a1, b1, c1 and d1 to produce intermediate values e1 and f1, from which a lattice coefficient can be calculated. However, in order to determine the next lattice coefficient, the basic cell of FIG. 4 must function as basic cell 2 of FIG. 5. In doing so, it processes values a2, b2, c2 and d2 to produce intermediate values e2 and f2. The values a2 and b2 are actually the same as two of the inputs to the first basic cell, namely c1 and d1.

Finally, the basic cell of FIG. 4 is used as basic cell 3 in FIG. 5, to calculate h1 and i1 based on e1, f1, e2 and f2, and the last lattice coefficient can be calculated from h1 and i1.

It will be appreciated that a superlattice of any size can be constructed from a single basic cell, in order to fully process the autocorrelation coefficients associated with a system having virtually any order.

In implementing the order recursive technique, with reference to FIG. 3, the autocorrelation coefficients from digital autocorrelator 10 are applied to the input device 42 and stored therein. The single basic cell would first produce $\zeta_0^1$ and $\zeta_2^1$ based on autocorrelation coefficients $r_0$, $r_1$ and $r_2$, and the lattice coefficient $k_1$, which in turn, is calculated from $r_1$ and $r_0$. The values of $k_1$, $\zeta_0^1$ and $\zeta_2^1$ are stored for later use. Then, $k_2$ would then be produced from $\zeta_0^1$ and $\zeta_2^1$, and $k_2$, $\zeta_0^1$ and $\zeta_2^1$ would be stored for further use. The single basic cell would then produce $\zeta_{-1}^1$ and $\zeta_3^1$ based on autocorrelation coefficients $r_1$, $r_2$ and $r_3$. These values would be "fed back" to the input of the basic cell, along with values $\zeta_0^1$ and $\zeta_2^1$ in order to produce $\zeta_0^2$ and $\zeta_3^2$, based on those values and $k_2$. At this point, the next lattice coefficient, $k_3$, can be produced from $\zeta_0^2$ and $\zeta_3^2$, and stored with the other lattice coefficients.

This process of recursively "feeding back" the intermediate variables into the basic cell to produce further intermediate values, to allow the production of further lattice coefficients, is repeated until the entire signal is processed in accordance with the scheme illustrated in FIG. 3.

Since only one basic cell is used in this case, a signal processor which uses the order recursive implementation is a strictly sequential machine requiring $p(p-1)$ machine cycles (on the order of p squared) to process a signal from a system having order p. However, since the single basic cell is the only computational structure involved, it is very easily implemented. Further, where the PARCORs are needed instead of the direct filter coefficients, the order recursive technique of the present invention is somewhat faster and much simpler than the Levinson-Durbin technique, but the LeRoux-Gueguen technique has the same complexity.

A computer program, written in Pascal, for simulating the order recursive signal processor, is set forth in Appendix 2, below.

Partitioned Parallel Implementation

As will be appreciated, the implementation of the present invention which produces the most rapid signal processing is the fully parallel implementation, discussed above. However, that technique has the disadvantage of requiring almost as many basic cells (p−1) as the order of the system to be investigated (p). Thus, for systems having a very large order, a fully parallel implementation may not be achievable because of lack of a sufficient number of processors. Also, a fully parallel implementation may in some cases be undesirable because of economics achievable through the use of fewer processors.

At the other extreme, the simplest way to implement the signal processor in accordance with the present invention is with the use of but a single basic cell, in the order recursive implementation. However, that implementation has the disadvantage of being the slowest, requiring on the order of $p^2$ operations in order to fully process the signal.

The present invention provides a compromise between the constraints of hardware complexity and processing speed through the use of "partitions" which "cut through" the superlattice structure, in parallel, but which are implemented in a time sequential manner.

Briefly, the partitioned parallel implementation employs the use of a plurality of basic cells, the number of basic cells being less than p−1, where p is the order of the system. By exploiting the presence of a plurality of parallel processors, in a single system, such as on a VLSI chip, the signal processor in accordance with the present invention will be capable of processing signals associated with virtually any system, of any order, faster than any presently known signal processor, with the exception of that proposed by Kung and Hu. However, as discussed above, the Kung and Hu implementation requires the use of as many processors as the order of the system, a requirement which will often be impossible to achieve. Furthermore, the fully parallel implementation of the present invention is as fast as the Kung and Hu technique.

The signal flow through the superlattice for the partitioned parallel implementation will be discussed with reference to FIG. 6, which illustrates a superlattice structure for processing a signal from a system having order 8. The signal is processed using only 3 basic cells, namely 50, 52, and 54, which process the autocorrelation coefficients r0 through r4 to produce the set of first intermediate values $\zeta_n^1$, n=−2, −1, 0, 2, 3, and 4.

These first intermediate values are "fed back" to the inputs of two of the basic cells, for example 52 and 54, and second intermediate values $\zeta_n^2$, n=−1, 0, 3 and 4, are produced. These second intermediate variables are "fed back" to but a single basic cell, for example, 54, and processed to produce third intermediate values $\zeta_0^3$ and $\zeta_4^3$.

Thus far, the basic cells 50, 52 and 54 have implemented, in parallel, the processing technique of the present invention, as shown in FIG. 3, but only for a portion, or "partition" of the superlattice, corresponding in width to the number of parallel basic cells employed. This partition will be referred to as "Partition 1". After processing Partition 1, the basic cells 50, 52 and 54 are now supplied with autocorrelation coefficients r3−r7, in order to implement a second partition, referred to in FIG. 6 as "Partition 2". The basic cells process the autocorrelation coefficients, to produce the first intermediate values $\zeta_n^1$, n=−3, −4, −5, 5, 6 and 7, which values are "fed back" to the basic cells 50, 52 and 54, along with two of the first intermediate values $\zeta_{-2}^1$ and $\zeta_4^1$ produced and stored during the processing of the first partition. The basic cells 50, 52 and 54 then process these values, in parallel, to produce the second intermediate values $\zeta_n^2$, n=−4, −3, −2, 5, 6 and 7. In a similar manner, these values are "fed back" to the basic cells 50, 52 and 54, along with two of the second intermediate values, $\zeta_{-1}^2$ and $\zeta_4^2$, produced and stored during the first partition, and the basic cells process those values, in parallel, to thereby derive the third intermediate values, $\zeta_n^3$ n=3, −2, −1, 5, 6 and 7. The third intermediate values are "fed back" to the basic cells, along with the third intermediate values, $\zeta_0^3$ and $\zeta_4^3$, produced and stored during Partition 1, to produce the fourth intermediate variables $\zeta_n^4$, n=−2, −1, 0, 5, 6, and 7. Since no fourth intermediate values were produced during Partition 1, only six fourth intermediate values are available and are applied to two of the basic cells, for example, 52 and 54. The six values are processed therein, in parallel, to produce the fifth intermediate variables $\zeta_n^5$, n=−1, 0, 6 and 7, which are in turn "fed back" to one of the basic cells, 54, for example, to thereby provide the sixth intermediate variables $\zeta_7^6$ and $\zeta_0^6$. As will be appreciated, during the processing of the first two partitions, the lattice coefficients which have been produced (k1-k7) are also stored.

It will also be appreciated that during the processing of Partitions 1 and 2, basic cells 50, 52 and 54 operate to "cut through" the superlattice in parallel, in order to provide lattice coefficients k2−k4, in Partition 1, and then recursively "cut through" the superlattice in parallel, to produce lattice coefficients k5−k7 in Partition 2. There now only remains the processing for the last lattice coefficient k8, which is accomplished in a third partition, "Partition 3". Since the system is of order 8, the processing during Partition 3 requires but a single basic cell, which can be any one of cells 50, 52 or 54.

Specifically, autocorrelation coefficients r6−r8 are applied to the selected basic cell and processed to produce the first intermediate values $\zeta_8^1$ and $\zeta_{-6}^1$. These values are "fed back" to the basic cell, along with two of the first intermediate values, namely $\zeta_7^1$ and $\zeta_{-5}^1$, produced and stored during Partition 2. These values are processed to produce second intermediate values $\zeta_8^2$ and $\zeta_{-5}^2$. The above process is repeated until the completion of Partition 3, at which time the last lattice coefficient k8 can be produced.

Thus, when the superlattice of the present invention is implemented using the partitioned parallel implementation, the effective signal flow is fully parallel within any one partition, allowing high-speed processing, yet recursive, or sequential, from partition to partition, thus allowing the processing of a signal from a very high order system using a limited, feasible number of basic cells.

A specific example of the partial partitioned implementation will now be described with further reference to FIGS. 7 and 8. As shown in FIG. 7, the signal processor is implemented using three parallel processors, 56, 58 and 60, designated "real processors", which include the basic cells 50, 52 and 54 of FIG. 6. As mentioned above, each of the processors 56, 58 and 60 can implement a basic cell either as one "two-cycled" processor, or as two "one-cycled" processors. Since the basic cells need only function to multiply and add, they readily lend themselves to implementation in the form of inexpensive and simple "reduced instruction set" (RIS) processors. Also shown in FIG. 7 are a plurality of other processors, termed "virtual processors", the existence of which is simulated, in order to process an input signal in accordance with the superlattice structure of FIG. 6.

Figure 6:
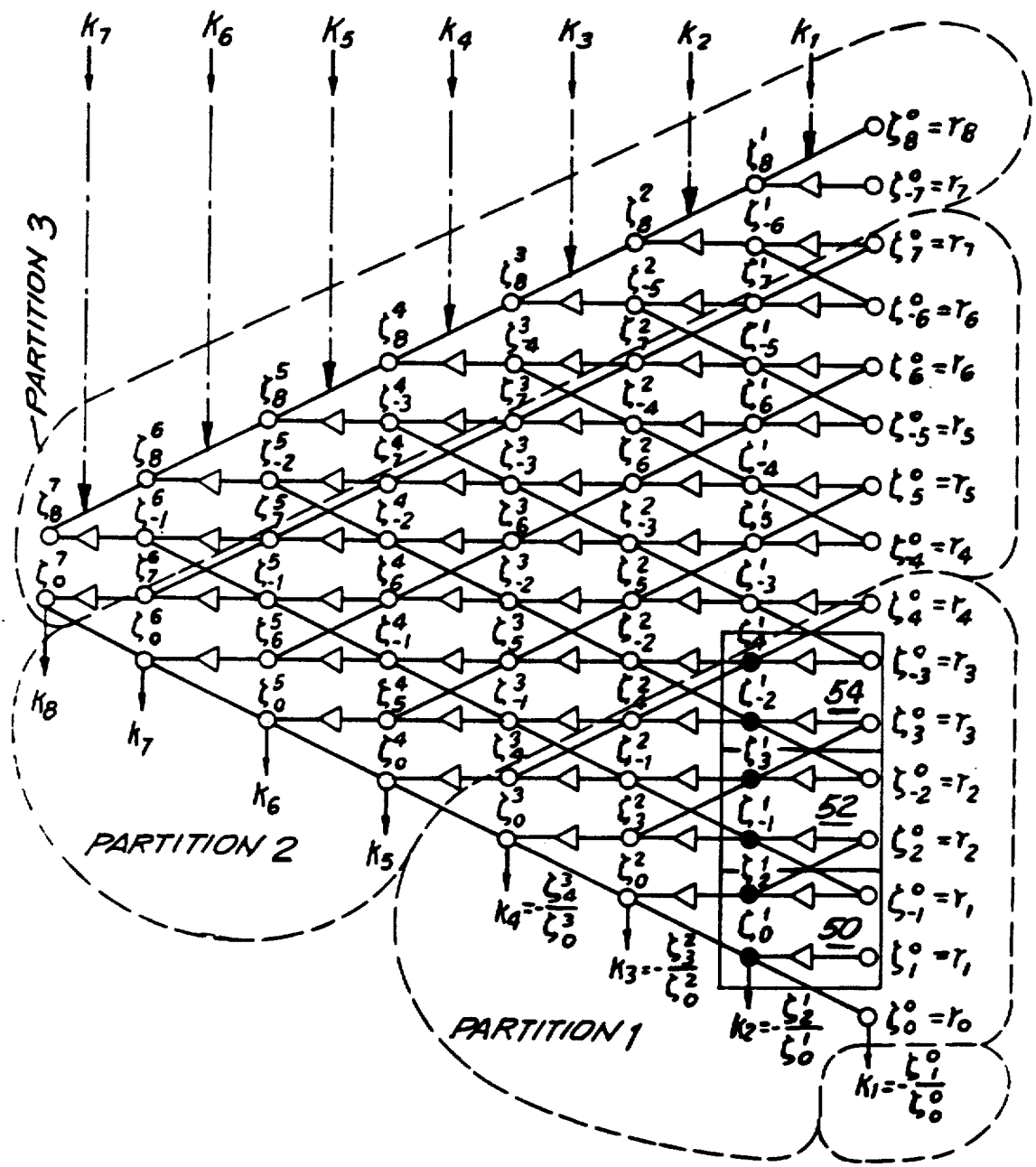
FIG. 6 illustrates the implementation of the superlattice structure using three basic cells, for a system having order 8.
Figure 7:
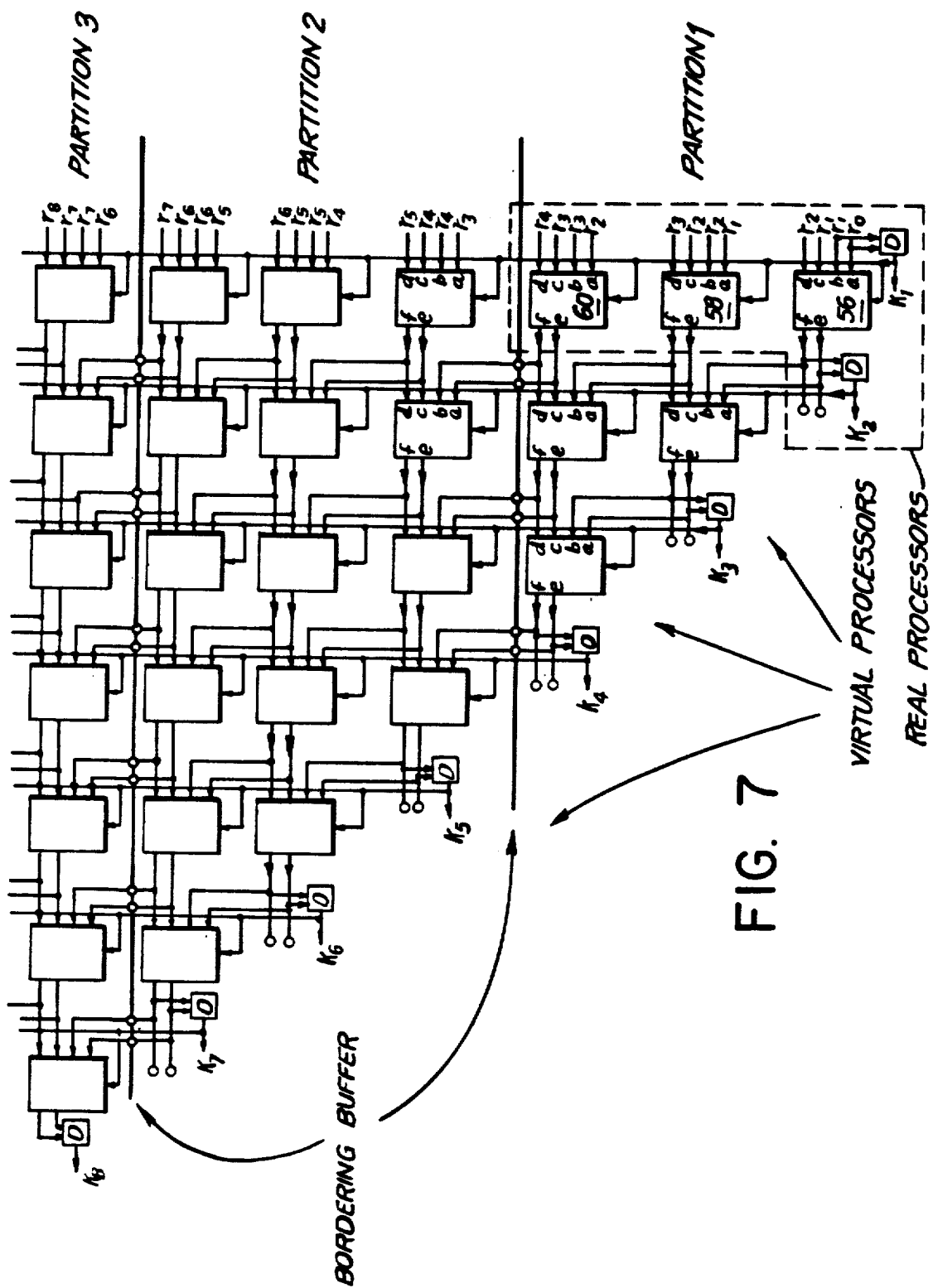
FIG. 7 illustrates the signal flow through real and virtual processors which implement the arrangement of FIG. 6.
Figure 8:
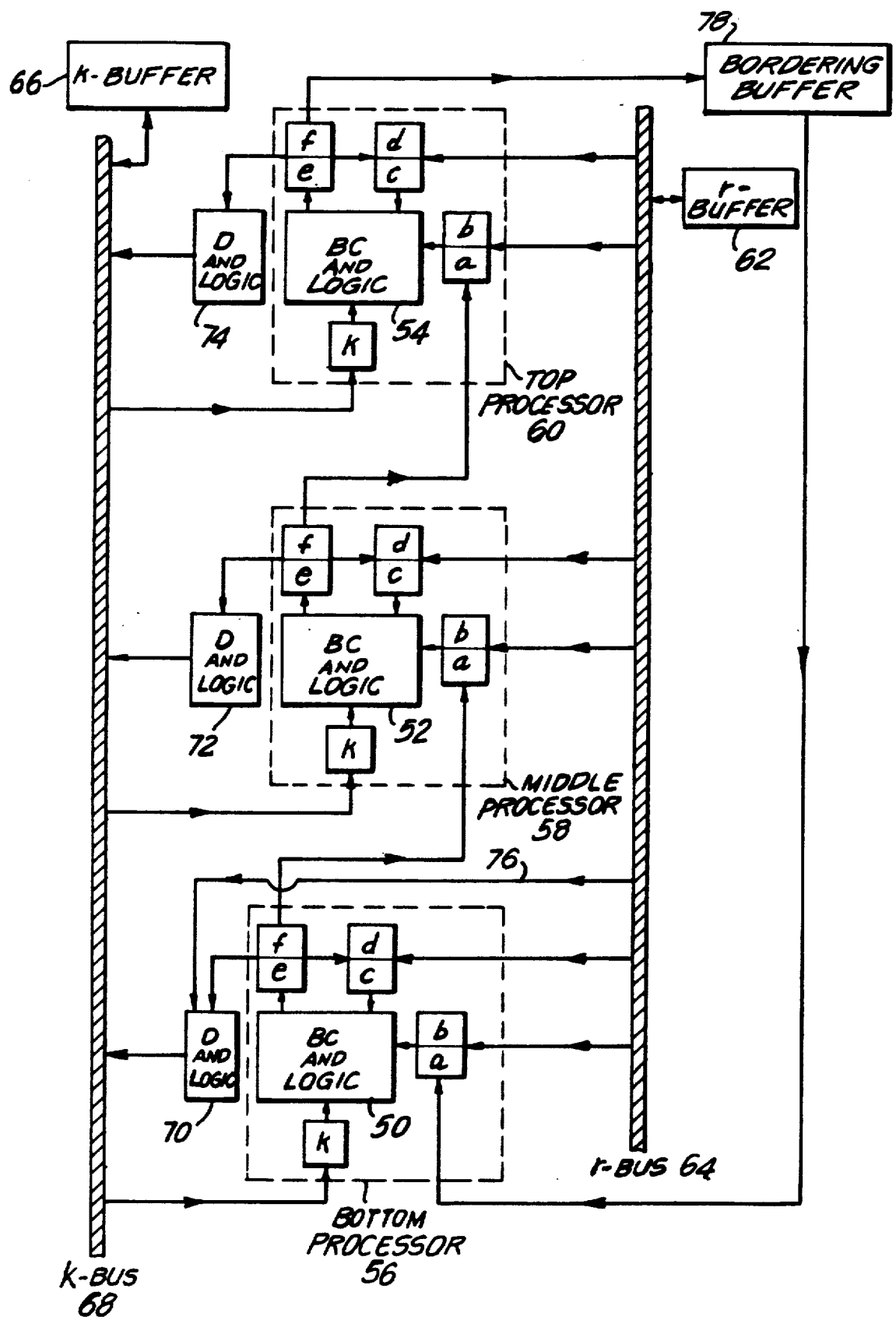
FIG. 8 illustrates the hardware implementation of the arrangement shown in FIGS. 6 and 7, in accordance with the present invention, illustrating the three basic cells and associated hardware.

Referring to FIG. 8, the parallel processors 56, 58 and 60 are shown as comprising the basic cells 50, 52 and 54, respectively, of FIG. 6. Each processor also comprises an "a, b Register", a "c, d Register", an "e, f Register" and a "k Register", which function to individually store values a, b, c, d, e and f, associated with each basic cell (see FIG. 4), and values k associated with lattice coefficients. An "r buffer" 62 is provided for receiving the autocorrelation coefficients $r_0 \ldots r_p$, and communicates with the processors 56, 58 and 60 by way of an "r bus" 64. Each of the a, b Registers and c, d Registers in each of the processors 56, 58 and 60, receives autocorrelation coefficients directly from the r bus 64. A "k buffer" 66 provides lattice coefficients k to each of the k Registers in processors 56, 58 and 60, via k bus 68. Dividers and associated logic 70, 72 and 74 are associated with the processors 56, 58 and 60, respectively, and function to receive an output from the e, f Register of its associated processor, produce the lattice coefficients associated therewith, and deliver them to the k Registers of the processors, and the k Buffer 66, via k bus 68. In addition, divider and logic 70 associated with the bottom processor 56, is also in communication with r bus 64 via bus 76, for the special function of the calculation of $k_1$, the first lattice coefficient, from autocorrelation coefficients $r_0$ and $r_1$.

Although a separate divider 70, 72 and 74 is shown as being provided for each processor 56, 58 and 60, a single divider and logic will suffice for the entire signal processor, and it is envisioned that when the present invention is embodied in a custom VLSI circuit, only a single divider will be provided. On the other hand, in the case where off-the-shelf commercial processors are used, separate dividers can be provided as shown, and may in fact form a part of each of the processors 56, 58 and 60. In the latter case, the use of all of the dividers is not necessary, and the requisite divisions can be performed by any one of the processors.

Within each processor, it is seen that the a, b Register, the c, d Register, and the k Register each provide signals to their associated basic cells, while the output of each basic cell is applied to its associated e, f Register. Each e, f Register provides an output to its associated c, d Register and divider.

Between processors, the output of the e, f Register of the bottom processor 56 is applied to the a, b Register of middle processor 58, while the output of the e, f Register in the middle processor 58 is applied to the a, b Register of the top processor 60. The output of the e, f Register of the top processor 60 is similarly applied to the input of the a, b Register of the bottom processor 56, by way of a bordering buffer 78.

The operation of the hardware shown in FIG. 8 to produce the superlattice processing structure illustrated in FIGS. 6 and 7 will now be described.

Phase 0—Initial Division ($k_1$ computation): The divider attached to the bottom-processor accepts the first two correlation coefficients from the r-buffer and produces $k_1$. All other elements are idle.

Phase 1—Initialization of partition 1: The a, b and c, d registers of all processors are initialized through the r-bus with the proper autocorrelation coefficients.

Phase 2—Basic cell computations: The basic-cells of all processors compute intermediate values and store them in the e, f registers of each processor.

Phase 3—$k_2$ computation—storage—transmission: The divider attached to the bottom processor computes $k_2$ from the e, f, register of this processor. $k_2$ is stored in the k-buffer and transmitted to the k-register of each processor through the k-bus.

Phase 4—Initialization of a, b and c, d registers, update of the bordering buffer:

The following transfers take place:

e,f of the bottom processor→a,b of the middle processor.

e,f of the middle processor→a,b of the top processor.

e,f of the top processor→the bordering buffer.

e,f of the middle processor→c,d of the middle processor.

e,f of the top processor→c,d of the top processor.

Phase 5—Basic cell computations with the bottom processor idle: The basic cells of the middle and top elements produce intermediate values which are stored in the corresponding e,f registers.

Phase 6—$k_3$ computation—storage—transmission: The divider attached to the middle processor computes $k_3$, fed by the e,f registers of this processor. $k_3$ is stored in the k-buffer and transmitted to the k-register of each processor through the k-bus.

Phase 7—Initialization of a,b and c,d registers, update of the bordering buffer:

The following transfers take place:

e,f of the middle processor→a,b of the top processor.

e,f of the top processor→bordering buffer.

e,f of the top processor→c,d of the top processor.

Phase 8—Top basic cell computation with the bottom and the middle processor idle: The top basic cell computes intermediate values which are stored in its e,f registers.

Phase 9—$k_4$ computation-storage: The divider attached to the top-processor computes $k_4$, fed by the e,f registers of that processor. $k_4$ is stored in the k-buffer, but it is not transmitted to the k-registers.

Phase 10—$k_1$ retransmission: $k_1$, which has been stored in the k-buffer, is transmitted to the k-registers of all processors through the k-bus.

Phase 11—Initialization of partition 2: The a,b and c,d registers of all processors are initialized through the r-bus with the proper autocorrelation coefficients.

Phase 12—Basic cells computation: The basic cells of all processors compute intermediate values and store them in the e,f registers of each processor.

Phase 13—Initialization of the a,b and c,d registers, update of the bordering buffer:

The following transfers take place:

e,f of the bottom processor→a,b of the middle processor.

e,f of the middle processor→a,b of the top processor.
e,f of the bottom processor→c,d of the processor.
e,f of the middle processor→c,d of the processor.
e,f of the top processor→c,d of the processor.
e,f of the top processor→bordering buffer.

The a,b register of the bottom processor must be initialized from the bordering buffer before the contents of the latter are destroyed by the storage of the newly computed contents of e, f in the top processor.

Phase 14—Basic cell computation: The same as phase 12.

Phase 15—a,b,c,d initialization, update of bordering buffer: The same as phase 13.

Phase 16—Basic cell computation: The same as phase 12.

Phase 17—a,b,c,d initialization, update of Bordering Buffer The same as phase 13.

Phase 18—Basic cell computation: The same as phase 12.

Phase 19—$k_5$ computation-storage transmission: The same as phase 3, but $k_5$ is computed-stored-transmitted instead of $k_2$.

Phase 20—a,b,c,d initialization, bordering buffer updating: The same as phase 4, but e,f are stored in a different register of the bordering buffer.

Phase 21—Basic cell computations with the bottom processor idle: The same as phase 5.

Phase 22—$k_6$ computation-storage-transmission: The same as phase 6, but $k_6$ is computed-stored-transmitted instead of $k_3$.

Phase 23—a,b,c,d initialization, bordering buffer udpating: The same as Phase 7, but e,f of the top processor are stored in different registers of the bordering buffer.

Phase 24—top basic cell computations with bottom and middle processors idle: The same as phase 8.

Phase 25—$k_7$ computation-storage: The same as phase 9, but $k_7$ is computed and stored instead of $k_4$.

Phase 26—$k_1$ retransmission: The same as phase 10.

Phase 27—Initialization of partition 3: The same as phase 11.

The continuation through the third partition will be understood by those skilled in the art in view of the foregoing.

It will be seen that the storage of intermediate values via the bordering buffer 78, in FIG. 8, is indicated, in FIG. 7 by a small circle in the data path as it crosses the functional location of the bordering buffer 78. It will thus be realized that the use of parallel processors in the partitioned parallel implementation introduces a "bordering discontinuity", leading to the organization of the hardware illustrated in FIG. 7.

In the example provided in FIGS. 6, 7 and 8, three parallel processors have been shown to illustrate the functioning of the partitioned parallel implementation, because of its general nature. It exhibits a lack of symmetry with regard to the behavior of each processor. For example, the middle processor 58 does not communicate with the bordering buffer. The top processor applies data to the bordering buffer, while the bottom processor receives data from the bordering buffer. Thus, the number of processors can be extended to as many as needed, by simply adding more processors of the "middle" type.

The superlattice concept is suitable for efficient hardware implementation with commercially available processors. A small number of processors, i.e., 3 to 6, may be used for many applications with very good results and a substantial increase in processing speed over that of prior art signal processors.

A computer program written in Pascal is provided in Appendix 3, below for simulating the parallel partitioned implementation of FIGS. 6-8, in the manner described above. Furthermore, the appended computer program can be modified by those skilled in the art, in a straightforward manner, in order to drive a multiprocessor version of the present invention, such as that shown in FIG. 8.

It will thus be appreciated that the present invention allows the use of a feasible number of parallel processors to perform highly efficient linear prediction signal processing. When so implemented, the "parallel-partitioned" implementation provides the benefits of parallel processing, manageable hardware complexity, and optimal signal processing for a given number of available processors.

It will also be appreciated that the superlattice structure of the present invention can be implemented in a fully parallel, or fully sequential manner, if desired.

Various changes and variations to the present invention will occur to those skilled in the art in view of the foregoing description. It is intended that all such changes and variations be encompassed so long as the present invention is employed, as defined by the following claims.

APPENDIX 1

```
(***************************************************************)
(*                                                               *)
(*   NAME:  AR_PAR                                               *)
(*                                                               *)
(*   PURPOSE:   COMPUTER SIMULATION OF LINEAR PREDICTION,        *)
(*              USING A PARALLEL IMPLEMENTATION OF THE           *)
(*                         SCHUR RECURSIONS ON THE SUPERLATTICE  *)
(*                                                               *)
(*   PARAMETERS:                                                 *)
(*        INPUT:   mo:ORDER OF THE PREDICTOR                     *)
(*                 r :AUTOCORRELATION SEQUENSE                   *)
(*        OUTPUT:  k :LATTICE (PARCOR) COEFFICIENTS              *)
(*                                                               *)
(*   PARAMETER TYPES:                                            *)
(*      cortype:  ARRAY[0..mo] OF REAL                           *)
(*      pcortype: ARRAY[1..mo] OF REAL                           *)
(*                                                               *)
(***************************************************************)
procedure AR_PAR(mo:integer; r:cortype;
                    var k: pcortype) ;
var a,b:array[0..50] of real;
    c,d:real;
    j,n:integer;

begin
   for j:=1 to mo do a[j]:=r[j];
   for j:=0 to mo do b[j]:=r[j];
   k[1]:=-r[1]/r[0];

for n:=1 to mo-1 do
   begin
       for j:=2 to (mo-n+1) do
       begin
          c:=a[j]+k[n]*b[j-1];
          d:=b[j-2]+k[n]*a[j-1];
          a[j-1]:=c;
          b[j-2]:=d
       end;
       k[n+1]:=-a[1]/b[0]
   end
end; (* procedure AR_PAR *)
```

APPENDIX 2

```
(*****************************************************************)
(*                                                               *)
(*  NAME    : AR_OR                                              *)
(*                                                               *)
(*  PURPOSE : COMPUTER SIMULATION OF LINEAR PREDICTION           *)
(*            USING AN ORDER-RECURSIVE IMPLEMENTATION            *)
(*            OF THE SCHUR RECURSIONS ON THE                     *)
(*                                  SUPERLATTICE                 *)
(*  PARAMETERS:                                                  *)
(*       INPUT:  mo: ORDER OF THE PREDICTOR                      *)
(*               r : AUTOCORRELATION SEQUENSE                    *)
(*       OUTPUT: k : LATTICE (PARCOR) COEFFICIENTS               *)
(*                                                               *)
(*  PARAMETER TYPES:                                             *)
(*     pcortype: ARRAY[0..mo] OF REAL                            *)
(*     cortype:  ARRAY[1..mo] OF REAL                            *)
(*                                                               *)
(*****************************************************************)
procedure AR_OR(mo:integer; r: cortype;
                   var  k: pcortype)

var a,b:array[1..50] of real;
    c,d,e,f:real;
    j,n:integer;

begin
   a[1]:=r[1];
   b[1]:=r[0];
   k[1]:=-r[1]/r[0];
   for j:=2 to mo do
   begin
      e:=r[j];
      f:=r[j-1];
      for n:=1 to j-1 do
      begin
         c:=e+k[n]*f;
         d:=b[n]+k[n]*a[n];
         a[n]:=e;
         b[n]:=f;
         e:=c;
         f:=d;
      end;
      k[j]:=-e/f;
      a[j]:=e;
      b[j]:=f
   end;
end;
```

APPENDIX 3

```
program simulation (input,output);

type     tr =array [0..100] of real;
         tk =array [1..100] of real;

var      r :tr;
         k :tk;
         system_order,i :integer;

(*****************************************************************)

procedure partitioned_parallel(system_order :integer; r :tr; var k :tk);

(*This procedure simulates the partitioned parallel implementation of the
  superlattice, using three (two cycled) processors which work concurrent-
  ly. It accepts the autocorrelation coefficients 'r' and the sytem order
  as input and produces the reflection coefficients 'k'. *)

const    nbr_of_processors = 3;

type     tb = array [1..100,1..2] of real;

var      rest,nbr_of_partitions,level,max_level,max_level_minus_1:integer;
         a_bottom,b_bottom,a_bottom_temp,b_bottom_temp:real;
         a_middle,b_middle,a_middle_temp,b_middle_temp:real;
         bor_buffer1_temp,bor_buffer2_temp:real;
         partition,proc:integer;
         bor_buffer:tb;
         e_top,f_top:real;
         e_middle,f_middle:real;
         e_bottom,f_bottom:real;

(* The designation of parameters a_bottom,b_bottom,a_bottom_temp,b_bottom_temp
        a_middle,b_middle,a_middle_temp,b_middle_temp
        bor_buffer1_temp,bor_buffer2_temp
        e_top,f_top,e_middle,f_middle,e_bottom,f_bottom is made for programming convenience only and is unrelated to the
       register names appearing in the diagram of fig. 8. *)

(*****************************************************************)

procedure initialize ( partition,proc : integer; var a,b,c,d : real );

var    offset : integer;

begin
      offset:=(partition-1)*3-1+proc;
      a:=r[offset];
      b:=r[offset+1];
      c:=b;
      d:=r[offset+2]
   end; (* of procedure initialize *)
```

```
(************************************************************)

procedure basic_cell ( a,b,c,d,k_mult : real; var e,f : real);
    begin
        f:=d+c*k_mult;
        e:=a+b*k_mult
    end; (* of procedure initialize *)

(************************************************************)

procedure bottom_processor ( partition,level : integer;
                                 bb1,bb2 : real;
                                 var a_bottom,b_bottom : real;
                                 var e,f:real );

var a,b,c,d,k_mult : real;

begin
        if level=1 then
            initialize ( partition,1,a,b,c,d )
                else
            begin
                a:=bb1;
                b:=nb2;
                c:=e;
                d:=f;
            end;
        k_mult:=k[level];
        basic_cell ( a,b,c,d,k_mult,e,f );
        a_bottom:=e;
        b_bottom:=f
    end; (* of procedure bottom_processor *)

(************************************************************)

procedure middle_processor ( partition,level : integer;
                                 a_bottom,b_bottom : real;
                                 var a_middle,b_middle : real;
                                 var e,f:real );

var a,b,c,d,k_mult : real;

begin
        if level=1 then
            initialize ( partition,2,a,b,c,d )
                else
            begin
                a:=a_bottom;
                b:=b_bottom;
                c:=e;
                d:=f
            end;
        k_mult:=k[level];
        basic_cell ( a,b,c,d,k_mult,e,f );
        a_middle:=e;
        b_middle:=f
    end; (* of procedure middle_processor *)
```

```
(***********************************************************************)

procedure top_processor ( partition,level : integer;
                               a_middle,b_middle : real;
                               var bor_buffer:tb;
                               var e,f:real ):

var   a,b,c,d,k_mult : real;

begin
    if level=1 then
        initialize ( partition,3,a,b,c,d )
              else
        begin
            a:=a_middle;
            b:=b_middle;
            c:=e;
            d:=f
        end;
    k_mult:=k[level];
    basic_cell ( a,b,c,d,k_mult,e,f );
    bor_buffer[level,1]:=e;
    bor_buffer[level,2]:=f
end; (* of procedure top_processor *)

(***********************************************************************)

begin rest:=(system_order-1) mod nbr_of_processors;
      nbr_of_partitions:=(system_order-1) div nbr_of_processors;
      if rest<>0 then nbr_of_partitions:=nbr_of_partitions+1;

k[1]:=-r[1]/r[0];

for partition:=1 to nbr_of_partitions do
          begin
              max_level:=partition*nbr_of_processors;
              for level:=1 to max_level-2 do
                  begin
                      a_bottom_temp:=a_bottom;
                      b_bottom_temp:=b_bottom;

bottom_processor ( partition,level,
                                         bor_buffer1_temp,bor_buffer2_temp,
                                         a_bottom,b_bottom,e_bottom,f_bottom);

a_middle_temp:=a_middle;
                      b_middle_temp:=b_middle;

middle_processor ( partition,level,
                                         a_bottom_temp,b_bottom_temp,
                                         a_middle,b_middle,e_middle,f_middle);

bor_buffer1_temp:=bor_buffer[level,1];
                      bor_buffer2_temp:=bor_buffer[level,2];

top_processor ( partition,level,
                                      a_middle_temp,b_middle_temp,
                                      bor_buffer,e_top,f_top);
                  end; (* of level loop *)

max_level_minus_1:=max_level-1;

k[max_level_minus_1]:=-b_bottom/a_bottom;

a_middle_temp:=a_middle;
              b_middle_temp:=b_middle;
```

```
    middle_processor ( partition,max_level_minus_1,a_bottom,b_bottom,
                       a_middle,b_middle,e_middle,f_middle);

k[max_level]:=-b_middle/a_middle;

top_processor ( partition,max_level_minus_1,
                    a_middle_temp,b_middle_temp,
                    bor_buffer,e_top,f_top );

top_processor ( partition,max_level,
                    a_middle,b_middle,
                    bor_buffer,e_top,f_top );

k[max_level+1]:=-bor_buffer[max_level,2]/bo__  ffe[max_level,1]
  end;

end; (* of procedure partitioned_parallel *)

gin
     (* Test data *)
     r[0] := 1;
     r[1] :=-0.2133256;
     r[2] := 0.2076102;
     r[3] :=-0.3665574;
     r[4] :=-0.2301161;
     r[5] := 0.2541363;
     r[6] :=-0.2486958;
     r[7] := 0.7792566;
     r[8] :=-0.1939328;
     r[9] := 0.2779704;
     r[10]:=-0.4803222;
     system_order:=10;

(* The results are the following :

k[1] = 0.2133256
     k[2] =-0.1698310
     k[3] = 0.3166915
     k[4] = 0.4394402
     k[5] =-0.3670546
     k[6] = 0.2772087
     k[7] =-0.6954674
     k[8] =-0.1866846
     k[9] =-0.0412548
     k[10]= 0.3098930   *)

partitioned_parallel(system_order,r,k);

for i:=1 to system_order do writeln(k[i]);
  end.
```

We claim:

1. A signal processor which receives autocorrelation coefficients $r_0$–$r_p$ from a system having order P, where P is an integer, for providing lattice coefficients $k_1$-$k_p$ of said system, comprising:

a plurality of physical parallel processing units, the number of which is less than the system order P, for receiving during a first time interval autocorrelation coefficients $r_0$ through $r_n$, where n is less than the system order P and is related to the number of said physical parallel processing units, said plurality of physical parallel processing units configured to concurrently produce first intermediate values $\zeta_i^1 = r_i + k_1 r_{i-1}$, for $i = 2$ through $n$, and $\zeta_{-i}^1 = r_i + k_1 r_{i+1}$, for $i = 0$ through $n-2$;

feedback means for applying selected ones of said first intermediate values to at least one of said physical parallel processing units, to produce at least a plurality of second intermediate values $\zeta_i^2 = \zeta_i^1 + k_2 \zeta_{2-i}^1$, for $i = 3$ through $n$, and $\zeta_{-i}^2 = \zeta_{-i}^1 + k_2 \zeta_{2+i}^1$, for $i = 0$ through $n-3$;

said first and second intermediate values being produced in succession within said first time interval; means for applying all remaining autocorrelation coefficients to at least one of said plurality of said physical parallel processing units if the system order P is less than 2n, and otherwise applying autocorrelation coefficients $r_{n-1}$ through $r_{2n-1}$ to said plurality of said physical parallel processing units, to thereby produce additional first and second intermediate values during a second time interval subsequent to said first time interval; and divider circuitry for dividing autocorrelation coefficient $r_1$ by $r_0$ to produce $k_1$, and for dividing first intermediate value $\zeta_2^1$ by $\zeta_0^1$ to produce $k_2$.

2. The signal processor of claim 1 wherein the number of said physical parallel processing units is equal to $n-1$, and each of said physical parallel processing units includes a butterfly basic cell.

3. The signal processor of claim 2 wherein each of said processors is comprised of two single-cycled processing elements.

4. The signal processor of claim 2 wherein each of said processors is comprised of a single three-cycle processing element.

5. A signal processor which receives autocorrelation coefficients $r_{-p}, r_{-p+1} \ldots r_0 \ldots r_{p-1}, r_p$, of a system having order P, where P is an integer, for providing P normal lattice coefficients $k_1$-$k_p$, and P adjoint lattice coefficients $k_1^* - k_p^*$ of said system, comprising:

a plurality of physical parallel processing units, the number of which is less than twice the system order P, for receiving during a first time interval autocorrelation coefficients $r_{-n}$ through $r_0$, and $r_0$ through $r_n$, where n is less than the system order P and is related to the number of said physical parallel processing units, said plurality of physical parallel processing units configured to concurrently produce first intermediate values $\zeta_i^1 = r_i + k_1 r_{i-1}$, for $i = -(n-2)$ through 0 and 2 through $n$, and $\xi_i^1 = r_i + k_1^* r_{i+1}$, for $i = -n$ through $-2$ and 0 through $n-2$;

feedback means for applying selected ones of said first intermediate values to at least a pair of said physical parallel processing units, to produce at least a plurality of second intermediate values $\zeta_i^2 = \zeta_i^1 + k_2 \xi_{i-2}^1$, for $i = -(n-3)$ through 0 and 3 through $n$, and $\xi_i^2 = \xi_i^1 + k_2^* \zeta_{i+2}^2$, for $i = -n$ through $-3$ and 0 through $n-3$, said first and second intermediate values being produced in succession within said first time interval; means for applying all remaining autocorrelation coefficients to at least a pair of said plurality of said physical parallel processing units if the system order P is less than 2n, and otherwise applying autocorrelation coefficients $r_{-2n+1}$ through $r_{-n+1}$ and $r_{n-1}$ through $r_{2n-1}$ to said plurality of said physical parallel processing units, to thereby produce additional first and second intermediate values during a second time interval subsequent to said first time interval; and divider circuitry for dividing selected autocorrelation coefficients to produce $k_1$ and $k_1^*$, and for dividing selected first intermediate values to produce $k_2$ and $k_2^*$.

6. The signal processor of claim 5 wherein the number of said physical parallel processing units is equal to $2(n-1)$, and each of said physical parallel processing units includes a butterfly basic cell.

7. The signal processor of claim 6 wherein each of said processors is comprised of two single-cycled processing elements.

8. The signal processor of claim 6 wherein each of said processors is comprised of a single two-cycle processing element.

9. Apparatus for receiving autocorrelation coefficients of a system having an order, and for producing therefrom lattice coefficients of said system, comprising:

a plurality of parallel processing units, the number of which is less than the order of said system, each of said processing units having input and output terminals and producing values at said output terminals as a function of values applied to said input terminals in accordance with a predefined recursion;

a buffer for initially applying to said input terminals of said plurality of parallel units less than all of said autocorrelation coefficients;

controlled feedback circuitry for feeding back selected ones of the values produced at the output terminals of said parallel processing units to selected input terminals thereof, said controlled feedback circuitry continuing said feeding back of selected outputs of said processing units to selected input terminals to thereby produce a first partition; said buffer applying additional autocorrelation coefficients to said input terminals of at least one of said plurality of parallel processing units after said first partition is produced, and said controlled feedback circuitry thereby producing at least a second partition; and divider circuitry for dividing selected ones of the values produced at the output terminals of said parallel processing units by other selected values produced at said output terminals to thereby produce said lattice coefficients.

10. The apparatus of claim 9 wherein each of said parallel processing units comprises a butterfly basic cell.

11. The apparatus of claim 9 further including a storage device for storing values from at least one selected output terminal of at least one of said processing units during said first partition, said storage device providing said stored values to an input terminal of at least one of said processing units during said second partition.

12. The apparatus of claim 9 wherein said controlled feedback circuitry feeds back selected ones of the values produced at the output terminals of said processing units to the input terminals of a lesser number of said processing units than the number of processing units from which said selected ones of said values were taken, and said controlled feedback circuitry continues said feeding back until said selected outputs are fed back to a single processing unit.

13. The apparatus of claim 9 wherein said buffer initially applies a number of autocorrelation coefficients to said parallel processing units, said number being related to the number of said parallel processing units.

14. Apparatus for receiving autocorrelation coefficients of a system having an order, and for producing therefrom lattice coefficients of said system, comprising:
a plurality of parallel processing units, the number of which is less than twice the parallel order of said system, each of said processing units having input and output terminals and producing values at said output terminals as a function of values applied to said input terminals in accordance with a predefined recursion;
a buffer for initially applying to said input terminals of said plurality of parallel processing units less than all of said autocorrelation coefficients;
controlled feedback circuitry for feeding back selected ones of the values produced at the output terminals of said parallel processing units to selected input terminals thereof, said controlled feedback circuitry continuing said feeding back of selected outputs of said processing units to selected input terminals to thereby produce a first partition;
said buffer applying additional autocorrelation coefficients to said input terminals of at least a pair of said plurality of parallel processing units after said first partition is produced, and said controlled feedback circuitry thereby producing at least a second partition; and
divider circuitry for dividing selected ones of the values produced at the output terminals of said parallel processing units by other selected values produced at said output terminals to thereby produce said lattice coefficients.

15. The apparatus of claim 14 wherein each of said parallel processing units comprises a butterfly basic cell.

16. The apparatus of claim 14 further including a storage device for storing values from at least one selected output terminal of at least one of said processing units during said first partition, said storage device providing said stored values to an input terminal of at least one of said processing units during said second partition.

17. The apparatus of claim 14 wherein said controlled feedback circuitry feeds back selected ones of the values produced at the output terminals of said processing units to the input terminals of a lesser number of said processing units than the number of processing units from which said selected ones of said values were taken, and said controlled feedback circuitry continues said feeding back until said selected outputs are fed back to a single pair of processing units.

18. The apparatus of claim 14 wherein said buffer initially applies a number of autocorrelation coefficients to said parallel processing units, said number being related to the number of said parallel processing units.

19. A method for producing lattice coefficients of a system having an order, comprising:
receiving autocorrelation coefficients of said system;
initially applying less than all of said autocorrelation coefficients to the input terminals of a plurality of parallel processing units, the number of which is less than the order of said system;
producing values at output terminals of said processing units as a function of values applied to said input terminals in accordance with a predefined recursion;
feeding back selected ones of the values produced at the output terminals of said parallel processing units to selected input terminals thereof;
continuing said feeding back of selected outputs to thereby produce and complete a first partition;
applying additional autocorrelation coefficients to said input terminals of at least one of said parallel processing units after said first partition is completed, to thereby produce at least a second partition; and
dividing selected ones of the values produced at the output terminals of said parallel processing units by other selected values produced at said output terminals to thereby produce said lattice coefficients.

20. The method of claim 19 wherein each of said parallel processing units is comprised of a butterfly basic cell.

21. The method of claim 19 further comprising:
storing values from at least one selected output terminal of at least one of said processing units during said first partition; and
applying said stored values to an input terminal of at least one of said processing units during said second partition.

22. The method of claim 19 wherein said step of feeding back comprises:
feeding back selected ones of the values produced at the output terminals of said processing units to the input terminals of a lesser number of said processing units than the number of processing units from which said selected ones of said values were taken; and
continuing said feeding back until said selected outputs are fed back to a single processing unit.

23. The method of claim 19 wherein said step of initially applying comprises the step of applying a number of autocorrelation coefficients to said parallel processing units, said number being related to the number of said parallel processing units.

24. A method for producing lattice coefficients of a system having an order, comprising:
receiving autocorrelation coefficients of said system;
initially applying less than all of said autocorrelation coefficients to the input terminals of a plurality of parallel processing units, the number of which is less than twice the order of said system;

producing values at output terminals of said processing units as a function of values applied to said input terminals in accordance with a predefined recursion;

feeding back selected ones of the values produced at the output terminals of said parallel processing units to selected input terminals thereof;

continuing said feeding back of selected outputs to thereby produce and complete a first partition;

applying additional autocorrelation coefficients to said input terminals of at least a pair of said parallel processing units after said first partition is completed, to thereby produce at least a second partition; and dividing selected ones of the values produced at the output terminals of said parallel processing units by other selected values produced at said output terminals to thereby produce said lattice coefficients.

25. The method of claim 24 wherein each of said parallel processing units is comprised of a butterfly basic cell.

26. The method of claim 24 further comprising:
storing values from at least one selected output terminal of at least one of said processing units during said first partition; and
applying said stored values to an input terminal of at least one of said processing units during said second partition.

27. The method of claim 24 wherein said step of feeding back comprises:
feeding back selected ones of the values produced at the output terminals of said processing units to the input terminals of a lesser number of said processing units than the number of processing units from which said selected ones of said values were taken; and
continuing said feeding back until said selected outputs are fed back to a single pair of processing units.

28. The method of claim 24 wherein said step of initially applying comprises the step of applying a number of autocorrelation coefficients to said parallel processing units, said number being related to the number of said parallel processing units.

* * * * *